US012383960B2

(12) United States Patent
Reutzel et al.

(10) Patent No.: US 12,383,960 B2
(45) Date of Patent: Aug. 12, 2025

(54) IN-SITU PROCESS MONITORING FOR POWDER BED FUSION ADDITIVE MANUFACTURING (PBF AM) PROCESSES USING MULTI-MODAL SENSOR FUSION MACHINE LEARNING

(71) Applicant: The Penn State Research Foundation, University Park, PA (US)

(72) Inventors: Edward Reutzel, University Park, PA (US); Jan Petrich, University Park, PA (US); Abdalla R. Nassar, University Park, PA (US); Shashi Phoha, University Park, PA (US); David J. Corbin, University Park, PA (US); Jacob P. Morgan, University Park, PA (US); Evan P. Diewald, University Park, PA (US); Robert W. Smith, University Park, PA (US); Zackary Keller Snow, University Park, PA (US)

(73) Assignee: THE PENN STATE RESEARCH FOUNDATION, University Park, PA (US)

( * ) Notice: Subject to any disclaimer, the term of this patent is extended or adjusted under 35 U.S.C. 154(b) by 362 days.

(21) Appl. No.: 18/002,883

(22) PCT Filed: Jul. 29, 2021

(86) PCT No.: PCT/US2021/043605
§ 371 (c)(1),
(2) Date: Dec. 22, 2022

(87) PCT Pub. No.: WO2022/060472
PCT Pub. Date: Mar. 24, 2022

(65) Prior Publication Data
US 2023/0234137 A1 Jul. 27, 2023

Related U.S. Application Data

(60) Provisional application No. 63/064,707, filed on Aug. 12, 2020.

(51) Int. Cl.
*B22F 10/85* (2021.01)
*B22F 10/366* (2021.01)
(Continued)

(52) U.S. Cl.
CPC ............ *B22F 10/85* (2021.01); *B22F 10/366* (2021.01); *B22F 10/38* (2021.01); *B22F 12/90* (2021.01);
(Continued)

(58) Field of Classification Search
CPC ........ B22F 10/85; B22F 10/38; B22F 10/366; B22F 10/28; B22F 12/90; B22F 2999/00; B33Y 40/00; B33Y 50/02
(Continued)

(56) References Cited

U.S. PATENT DOCUMENTS 12,053,841 B2 * 8/2024 Dave ...................... G01K 11/00
2017/0304944 A1 * 10/2017 Symeonidis .............. B22F 7/06
(Continued)

FOREIGN PATENT DOCUMENTS

CN 108303043 A 7/2018

OTHER PUBLICATIONS

International Search Report for PCT/US2021/043605 dated Apr. 8, 2022.
(Continued)

*Primary Examiner* — Allen H Nguyen
(74) *Attorney, Agent, or Firm* — Buchanan Ingersoll & Rooney PC

(57) ABSTRACT

Embodiments relate to in-situ process monitoring of a part being made via additive manufacturing. The process can
(Continued)

involve capturing computed tomography (CT) scans of a post-built part. A neural network (NN) can be used during the build of a new part to process multi-modal sensor data. Spatial and temporal registration techniques can be used to align the data to x,y,z coordinates on the build plate. During the build of the part, the multi-modal sensor data can be superimposed on the build plate. Machine learning can be used to train the NN to correlate the sensor data to a defect label or a non-defect label by looking to certain patterns in the sensor data at the x,y,z location to identify a defect in the CT scan at x,y,z. The NN can then be used to predict where defects are or will occur during an actual build of a part.

23 Claims, 13 Drawing Sheets

(51) Int. Cl.
  *B22F 10/38* (2021.01)
  *B22F 12/90* (2021.01)
  *B22F 10/28* (2021.01)
  *B33Y 40/00* (2020.01)
  *B33Y 50/02* (2015.01)

(52) U.S. Cl.
  CPC ............ *B22F 10/28* (2021.01); *B22F 2999/00* (2013.01); *B33Y 40/00* (2014.12); *B33Y 50/02* (2014.12)

(58) Field of Classification Search
  USPC .......................................................... 382/141
  See application file for complete search history.

(56) References Cited

U.S. PATENT DOCUMENTS

2024/0375180 A1\* 11/2024 Ortega Varela De Seijas ............. B22F 10/00
2025/0050447 A1\* 2/2025 Buller ..................... B22F 12/45

OTHER PUBLICATIONS

Written Opinion of the International Searching Authority for PCT/US2021/043605 dated Apr. 8, 2022.
"Multi-sensor Measurement and data fusion technology for manufacturing process monitoring: a literature review" Lingbao Kong, et al., Open Access IOP Publishing IMMT, Int. J. Extrem. Manuf. 2 (2020); International Journal of Extreme Manufacturing, https://doi.org./10.1088/2631-7990/ab7ae6.
"Data Fusion for Additive Manufacturing Process Inspection" A Thesis in Electrical Engineering by Jacob P. Morgan, May 2019.

\* cited by examiner

IN-SITU PROCESS MONITORING FOR POWDER BED FUSION ADDITIVE MANUFACTURING (PBF AM) PROCESSES USING MULTI-MODAL SENSOR FUSION MACHINE LEARNING

CROSS-REFERENCE TO RELATED APPLICATIONS

This application is the U.S. national stage application of International Patent Application No. PCT/US2021/043605 filed on Jul. 29, 2021, which is related to and claims the benefit of U.S. provisional application 63/064,707, filed on Aug. 12, 2020, the entire contents of which is incorporated herein by reference.

STATEMENT REGARDING FEDERALLY SPONSORED RESEARCH AND DEVELOPMENT

This invention was made with government support under Contract No. N00024-12-D-6404, DO #17F8346 awarded by the U.S. Navy/NAVSEA and under Contract No. N00024-18-D-6401, DO #18F8437, awarded by the U.S. Navy/NAVAIR. The Government has certain rights in the invention."

FIELD OF THE INVENTION

Embodiments relate to in-situ process monitoring of a part being made via additive manufacturing that uses a neural network (NN) during the build of a new part in combination with multi-modal sensor data. During the build of the new part, the multi-modal sensor data is superimposed on the build plate, and machine learning is used to correlate the sensor data to a defect label or a non-defect label by looking to certain patterns in the sensor data. The NN can then be used to determine where defects are or predict where defects will occur during an actual build of a part. For NN training, high resolution X-ray computed tomography (CT) scans of a post-built part are captured and defects identified. The corresponding locations of those true defects are overlaid with the multi-modal sensor data post build to provide true defect labels to train the NN.

BACKGROUND OF THE INVENTION

Conventional systems and techniques are limited to detecting defects in a build after the build is made, as opposed to real-time defect identification as the build is being made. Known system and methods for assessing the quality of the build can be appreciated from U.S. Pat. Nos. 10,421,267, 9,751,262, U.S. Pat. Publ. No. 2014/0312535, U. S. Pat. Publ. No. 2015/0045928, U.S. Pat. Publ. No. 2015/0331402, U.S. Pat. Publ. No. 2016/0052086, U.S. Pat. Publ. No. 2017/0292922, "Combine CT Scanning with Additive Manufacturing" by Brian Albright, Jan. 2, 2018, available at https://www.digitalengineering247.com/article/combine-ct-scanning-additive-manufacturing/, and "GE sees potential in 'self-inspecting' metal Additive Manufacturing systems" Metal A M, Oct. 27, 2017, available at https://www.metal-am.com/ge-sees-potential-self-inspecting-metal-additive-manufacturing-systems/.

SUMMARY OF THE INVENTION

Embodiments relate to in-situ process monitoring of a part being made via additive manufacturing. The process can involve capturing high resolution computed tomography (CT) scans of a post-built part, wherein low CT intensities in the CT scans are identified as defects or pores in that part. This is done for many post-built parts to develop a library by which machine learning can be used to identify defects or pores of a part as it is being built. The machine learning process can involve using the CT imagery to identify defects and relate their locations to the corresponding pixel location in a layerwise optical image. The first step can involve mapping x,y,z coordinates of the CT scans onto a build plate (or some reference frame). A neural network (NN) can be used during the build of a new part to interpret the collected optical, acoustic, multi-spectral, and scan vector data. Spatial and temporal registration techniques can be used to align the data to x,y,z coordinates on the build plate. The NN can utilize sensor fusion techniques to generate a footprint of the aligned data during the build of the new part. This can involve aligning all sensor data modalities into one multi-modal footprint. During the build of the part, the multi-modal footprint can be superimposed on the build plate. Machine learning can be used to train the NN to correlate the footprints to labels (a label being a "defect" or "no defect"). For instance, when the machine learning identifies a defect in the CT scan at x,y,z, it can use that to train the NN by looking to certain patterns (e.g., anomalies) in the sensor modality data at the x,y,z location. These patterns can then be used to correlate the footprint to labels. Once the NN is trained, the NN, along with the footprints, can be used in practice to predict where defects are or will occur during an actual build of a part.

In an exemplary embodiment, a multi-modal sensor system for an additive manufacturing machine includes a computer device and a sensor system. The sensor system includes an optical sensor configured to record optical imagery of each layer of a part being formed via additive manufacturing and generate optical data output. Multiple flash configurations may be used to expose the build to different lighting conditions. Images may be taken before and after the laser scan. The sensor system includes acoustic sensors configured to record acoustic data of a build chamber within which the part is being formed and generate acoustic data output. The sensor system includes multi-spectral sensors configured to record spectral data of each layer of the part and generate spectral data output. The sensor system may also capture scan vector information. The sensor system generates a multi-modal sensor output that is a compilation of the optical data output, the acoustic data output, the spectral data output, and the scan vector output. The computer device receives the multi-modal sensor output and generates a multi-modal footprint that is superimposed on a build plate of an additive manufacturing machine.

In an exemplary embodiment, an in-situ additive manufacturing process monitoring system includes an additive manufacturing machine configured to generate a part on a build plate within a build chamber via additive manufacturing. The system includes an X-ray computed tomography (CT) scanner configured to produce CT data from a post-built part made via additive manufacturing. The system includes a multi-modal sensor system. The multi-modal sensor system includes an optical sensor configured to record optical imagery of each layer of a part being formed via additive manufacturing and generate optical data output. Multiple flash configurations may be used to expose the build to different lighting conditions. Images may be taken before and after the laser scan. The multi-modal sensor system includes acoustic sensors configured to record acoustic data of the build chamber within which the part is being formed and generate acoustic data output. The multi-modal sensor system includes multi-spectral sensors configured to record spectral data of each layer of the part and generate spectral data output. The sensor system may also capture scan vector information. The sensor system generates a multi-modal sensor output that is a compilation of the optical data output, the acoustic data output, the spectral data output, and the scan vector output. The system includes a computer device configured to receive the CT data of the post-built part and the multi-modal sensor data of the part being formed. The computer device is configured to: identify x,y,z coordinates of the post-built part related to low CT intensities, the x,y,z coordinates being locations of defects in the post-built part; map the low CT intensity x,y,z coordinates to the build plate of the additive manufacturing machine before and during the part is being formed; identify patterns in the multi-modal sensor output data that correspond to the low CT intensity x,y,z coordinates; co-register the low CT intensity x,y,z coordinates with x,y,z multi-modal sensor coordinates; label x,y,z multi-modal sensor coordinates as a defect or a non-defect; and generate one or more pattern-labeled footprints.

In some embodiments, the computer device receives multi-modal sensor output data as the additive manufacturing machine is used to generate a new part. In some embodiments, the computer device compares the multi-modal sensor output data to the one or more pattern-labeled footprints to detect a defect in the new part as the new part is being formed and/or to predict the formation of a defect in the new part as the new part is being formed.

In some embodiments, the computer device is configured to utilize Gabor and/or Gaussian filtering techniques to identify x,y,z coordinates of the post-built part related to low CT intensities.

In some embodiments, the computer device is configured to utilize sensor fusion to generate the multi-modal sensor data output.

In some embodiments, the computer device is configured to utilize a neural network and machine learning to identify patterns in the multi-modal sensor output data that correspond to the low CT intensity x,y,z coordinates.

In some embodiments, the CT scanner produces CT data from a plurality of post-built parts made via additive manufacturing. The computer device receives the CT data from the plurality of post-built parts to generate a library of CT data and stores the library of CT data in a database. A computer device receives the CT data of the post-built part when the part is being formed by accessing the library of CT data in the database.

In an exemplary embodiment, a method of in-situ process monitoring for an additive manufacturing process involves generating X-ray computed tomography (CT) data from a post-built part made via additive manufacturing. The method involves identifying x,y,z coordinates of the post-built part related to low CT intensities, the x,y,z coordinates being locations of defects in the post-built part. The method involves mapping the low CT intensity x,y,z coordinates to a build plate of an additive manufacturing machine. The method involves collecting multi-modal sensor data comprising optical data, acoustic data, multi-spectral data, and scan vector data of a part being built via additive manufacturing, the part being built on the build plate with the mapped low CT intensity x,y,z coordinates. The method involves identifying patterns in the multi-modal sensor data that correspond to the low CT intensity x,y,z coordinates. The method involves co-registering the low CT intensity x,y,z coordinates with x,y,z multi-modal sensor coordinates. The method involves labelling x,y,z multi-modal sensor coordinates as a defect or a non-defect. The method involves generating one or more pattern-labeled footprints.

In some embodiments, the method involves generating a new part via additive manufacturing. In some embodiments, the method involves receiving multi-modal sensor data as the new part is being generated. In some embodiments, the method involves comparing the multi-modal sensor data to the one or more pattern-labeled footprints to detect a defect in the new part as the new part is being generated and/or to predict the formation of a defect in the new part as the new part is being generated.

In some embodiments, the method involves identifying x,y,z coordinates of the post-built part related to low CT intensities via Gabor and/or Gaussian filtering techniques.

In some embodiments, the method involves generating the multi-modal sensor data via sensor fusion.

In some embodiments, the method involves identifying patterns in the multi-modal sensor data that correspond to the low CT intensity x,y,z coordinates via a neural network and machine learning.

In some embodiments, the method involves generating CT data from a plurality of post-built parts made via additive manufacturing.

In some embodiments, the method involves receiving the CT data from the plurality of post-built parts to generate a library of CT data.

In some embodiments, the method involves accessing the library of CT data to receive the CT data of the post-built part.

In some embodiments, the method involves aborting the build of the new part when the defect is detected and/or predicted.

In some embodiments, the method involves adjusting operating parameters of the additive manufacturing process used to build the new part when the defect is detected and/or predicted.

In some embodiments, the method involves using operating parameters associated with the one or more pattern-labeled footprints to adjust the operating parameters.

In some embodiments, the method involves generating a new part via additive manufacturing. In some embodiments, the method involves receiving multi-modal sensor data as the new part is being generated. In some embodiments, the method involves comparing the multi-modal sensor data to the one or more pattern-labeled footprints to determine and/or predict material properties of the new part as the new part is being generated.

In some embodiments, the method involves generating a new part via additive manufacturing. In some embodiments, the method involves receiving multi-modal sensor data as the new part is being generated. In some embodiments, the method involves comparing the multi-modal sensor data to the one or more pattern-labeled footprints to identify x,y,z coordinates in the new part that correspond to detects in the new part. In some embodiments, the method involves using the identification of the x,y,z coordinates to guide post-build inspection.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present invention will be more apparent from the following more particular description thereof, presented in conjunction with the following drawings. Like reference numbers used in the drawings may identify like components.

DETAILED DESCRIPTION OF THE INVENTION

Figure 1:
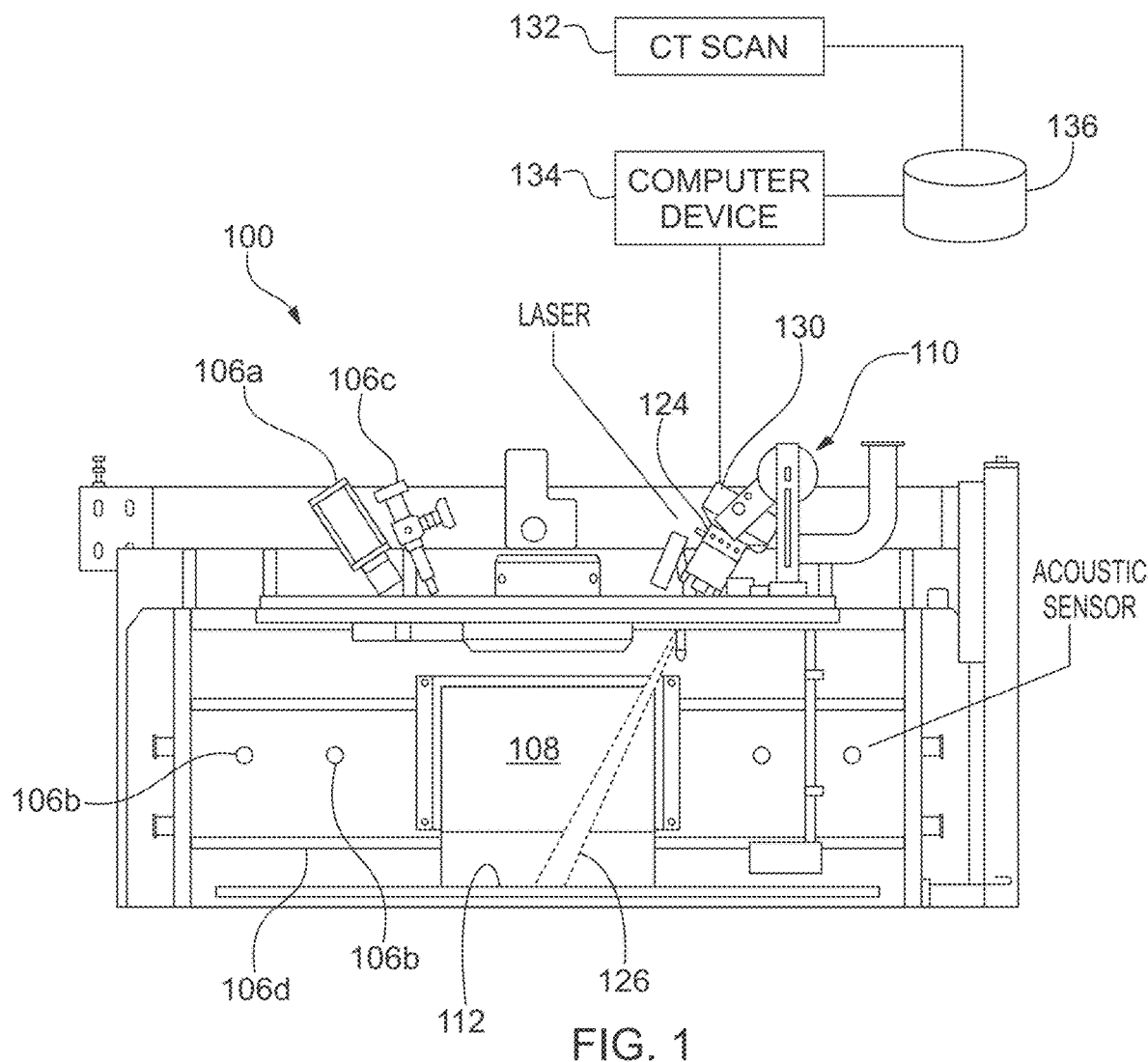
FIG. 1 shows an exemplary embodiment of an in-situ process monitoring system configuration.
Figure 2:
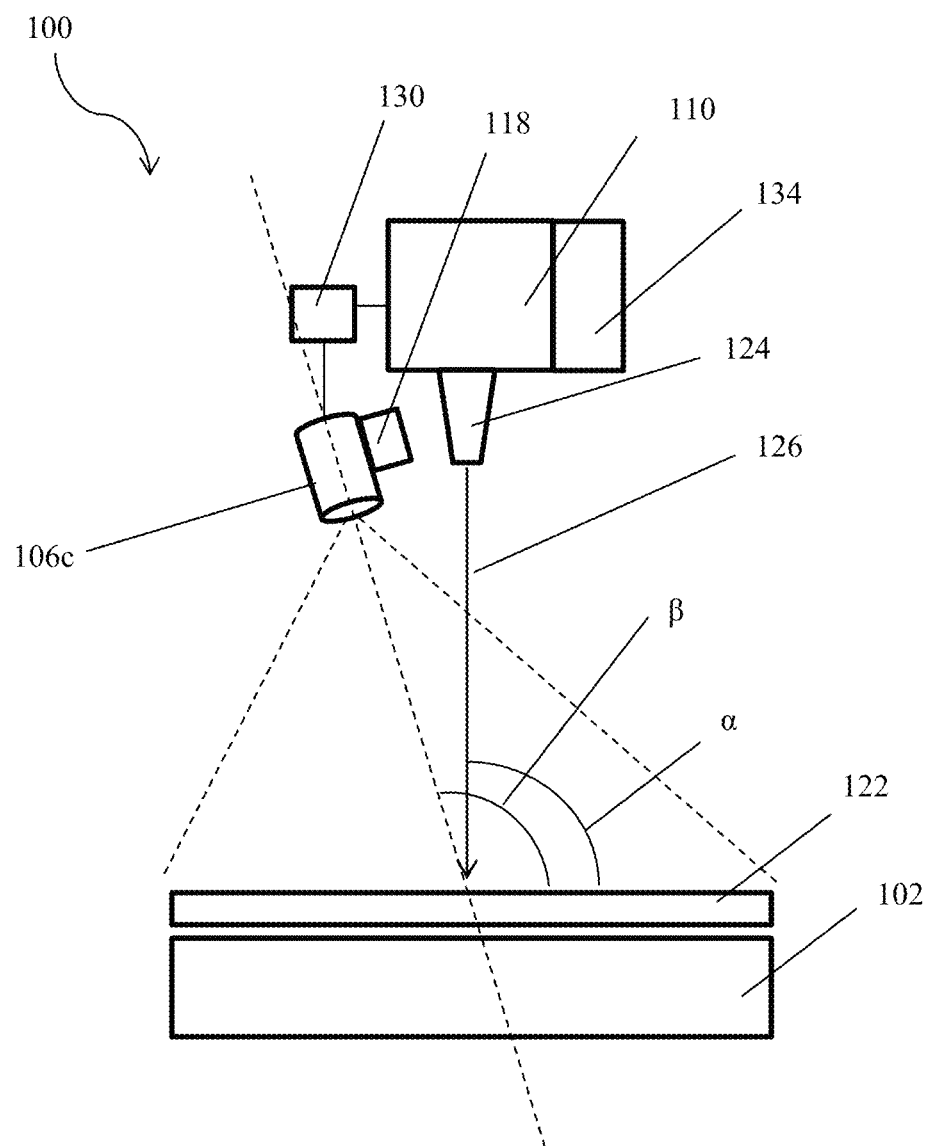
FIG. 2 shows another exemplary embodiment of an in-situ process monitoring system configuration.
Figure 3:
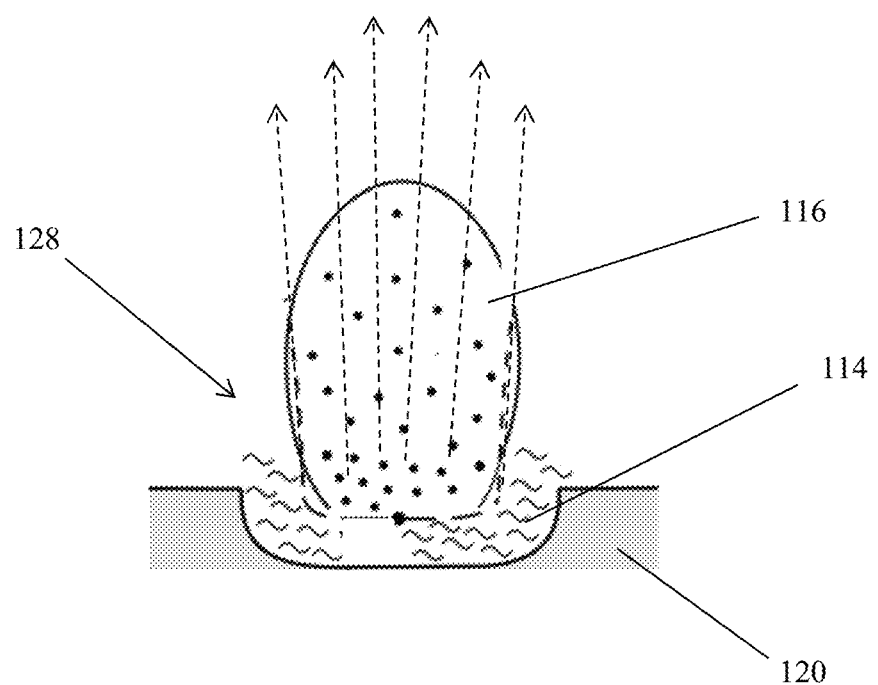
FIG. 3 shows an interaction zone for a part being built via additive manufacturing.
Figure 4:
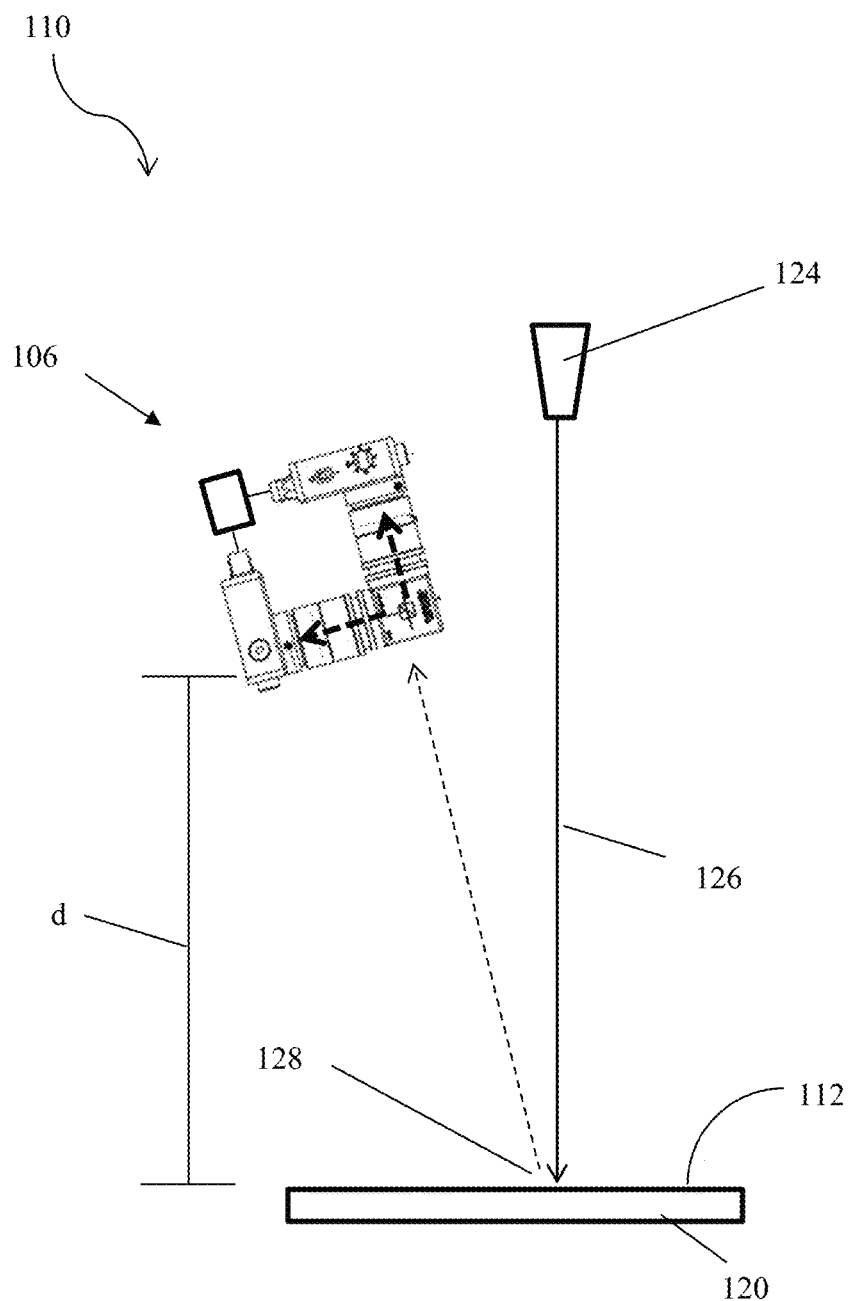
FIG. 4 shows an exemplary additive manufacturing machine system configuration.

The following description is of exemplary embodiments that are presently contemplated for carrying out the present invention. This description is not to be taken in a limiting sense, but is made merely for the purpose of describing the general principles and features of the present invention. The scope of the present invention is not limited by this description.

Embodiments relate to a system 100 and a method related to in-situ monitoring of a part being made via additive manufacturing. The process can involve capturing high resolution computed tomography (CT) scans of a post-built part, wherein low CT intensities in the CT scans are identified as defects and pores in that part. This is done for many post-built parts to develop a library by which machine learning can be used to identify defects and pores of a part as it is being built. The machine learning process can involve using the CT imagery to identify defects and relate their locations to the corresponding pixel location in a layerwise optical image. The first step can involve mapping x,y,z coordinates of the CT scans onto a build plate 102 (or some reference frame). A neural network (NN) 104 can be used during the build of a new part to interpret the collected sensor data, which may include data from a sensor system 106. This can include any one or combination of optical data, acoustic data, multi-spectral data, and scan vector data. Spatial and temporal registration techniques can be used to align the sensor data to x,y,z coordinates on the build plate 102. The NN 104 can utilize sensor fusion techniques during the build of the new part to generate a footprint of the aligned data. This can involve aligning all sensor data modalities into one multi-modal footprint. During the build of the new part, the multi-modal footprint can be superimposed on the build plate 102. Machine learning can be used to train the NN 104 to correlate the footprints to labels (a label being a "defect" or "no defect"). For instance, when the machine learning identifies a defect in the CT scan at x,y,z, it can use that to train the NN 104 by looking to certain patterns (e.g., anomalies) in the sensor modality data at the x,y,z location. These patterns can then be used to correlate the footprint to labels. Once the NN 104 is trained, the NN 104, along with the footprints, can be used in practice to predict where defects are or will occur during an actual build of a part.

While embodiments of the system 100 and methods related thereto are described and illustrated for used during additive manufacturing of a part, and in particular Powder Bed Fusion Additive Manufacturing (PBFAM) of a part, it is should be understood that the system 100 can be used in any situation where in-situ monitoring of parts being manufactured in a layer-by-layer manner is desired.

Referring to FIGS. 1-4, embodiments of the system 100 can include to a sensor system 106. The sensor system 106 can include any one or combination of an optical sensor 106a, an acoustic sensor 106b, a multi-spectral sensor 106c, and/or scan vector data 106d. It is contemplated for the system 100 to use all three sensors as part of the sensor system 106 so as to facilitate generating multi-modal sensor data—each type of sensor generating a different mode of sensor data. There can be any number of optical sensors 106a, acoustic sensors 106b, multi-spectral sensors 106c, and/or scan vector data 106d modalities used.

The optical sensor 106a can include a high speed video camera (e.g., a charged coupled device camera) configured to collect optical images and/or video from a part being generated during the build process via additive manufacturing. Multiple flash configurations may be used to expose the build to different lighting conditions. Images may be taken before and after the laser scan.

The acoustic sensor 106b can be configured to collect acoustic data from the build chamber 108 of an Additive Manufacturing Machine (AMM) 110, the build chamber 108 being the region where the part is being built. The acoustic sensor 106b can include a microphone, an ultrasonic microphone, an infrasonic microphone, etc. These can be any one or combination of resistive microphones, condenser microphones, fiber-optic microphones, piezoelectric microphones, etc. It is contemplated for acoustic emissions to be captured inside the build chamber 108 at frequencies of up to 192 kHz so that the acoustics data contains information in the audible and inaudible (ultrasound) spectrum. Machine learning techniques can be used to derive information content metrics by identifying frequency bands that are most relevant to the application at hand.

Figure 9:
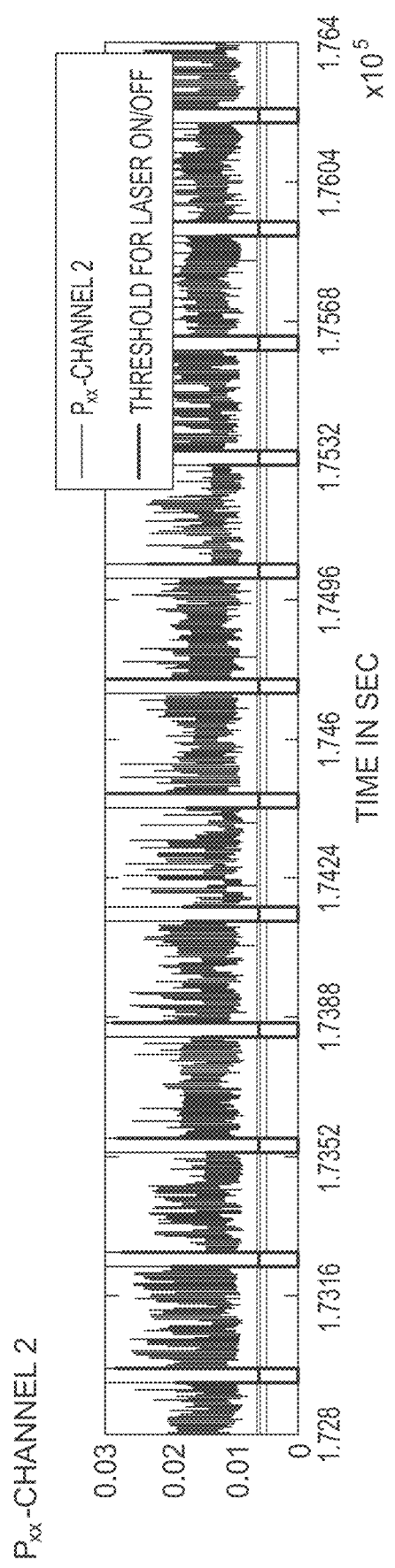
FIG. 9 shows acoustic signal power over time window of 1 sec, or 192,000 samples, collected form an exemplary acoustic sensor, allowing the data to be partitioned into the individual laser tracks.

FIG. 9 shows the signal power $P_{xx}(T)$ of the acoustic emissions x(t) captures over several build layers. Specifically, we define the respective signal power as $$P_{xx}(T) = \frac{1}{2\Delta t}\int_{T-\Delta t}^{T+\Delta t} |x(t)|^2 dt \qquad \text{Eq. (1)}$$

In Eq, (1), acoustic power is averaged over a time window of $2\Delta t=1$ sec.

As one can see, acoustic emissions are most noticeable during the build process and reduce in intensity during the recoating process, i.e. in between build layers. This in turn allows for a clear separation between individual build layers.

The multi-spectral sensor 106c can be configured to collect optical emissions at different wavelengths from a surface 112 of a part being generated during the additive manufacturing build process. For example, the multi-spectral sensor 106c can be configured to collect spectral data from a surface 112 (including the melt pool 114 and plume 116—see FIG. 3) of a part as the part is being fabricated via an additive manufacturing process. In one embodiment, the multi-spectral sensor 106c can be configured to detect material interactions via received optical emissions by spectral analysis. For example, the multi-spectral sensor 106c can include an optical receivers (or photo diodes) configured to separate the light into spectral components. In some embodiment, the multi-spectral sensor 106c can include an optical emission spectrometer 118 configured to analyze the detected light via spectral analysis.

In an exemplary embodiment, spectral emissions generated during the PBFAM process can be recorded using a multi-spectral sensor 106c that generates a signal that corresponds with lack-of-fusion defects. The multi-spectral sensor 106c can include two Avalanche Photodiodes (APD) fitted with material-specific optical filters. Emissions from the build process can be transferred to the APDs via liquid-light guide, which are then divided using a 50:50 beam splitter. With some embodiments designed to measure the line-to-continuum ratio of emission lines, the multi-spectral sensor 106c can capture spectral emissions from the build process at a rate of 50 kHz. The multi-spectral sensor 106c can be configured to be communicatively associated with the optical emission spectrometer 118 or the optical emission spectrometer 118 can be part of the multi-spectral sensor 106c. An example of the optical emission spectrometer 118 can be a low-speed (e.g., 5 Hz) spectrometer.

Scan vector data 106d can be collected from an Additive Manufacturing Machine (AMM) 110. It contains x,y,z, trajectory of the laser as function of time including power and speed settings. From these data, a variety of metrics potentially linked to local process physics may be calculated, such as the distance of a point to the contours, the hatch-contour interface angle, the hatch sequence order, etc.

An embodiment of the system 100 includes an additive manufacturing apparatus (AMA) 110 (e.g., ProX 200 Machine). The AMA 110 can be a machine configured to generate a part by adding build material 120 or components in a layer 122 by layer 122 fashion. In some embodiments, each layer 122 may be formed from a powder material or other layer 122 material being added to a portion of the part, or a substrate, as the part is being fabricated.

For instance, the process of generating a part in such a manner can be referred to as the build process or the build. The build can involve depositing a layer 122 of build material 120 (a layer of build material may be referred to as a bed) on a build plate 102. The build material 120 can be in powder form. An energy source 124 can be used to generate a plume or plasma of the build material 120. Upon cooling, the build material 120 fuses together to form an integral piece of the part. Another layer 122 of build material 120 can be deposited and the process can be continued. In some embodiments, the build plate 102 can be moved downward to after each layer 122 is deposited during the build. The type of build material 120, the layer 122 thickness, the movement of the energy source 124, the movement of the build plate 102, etc. can be controlled via a processor that has been programmed to execute operations in accordance with an additive manufacturing file. The additive manufacturing file can be a program logic that has build material 120 specifications (e.g., material and chemical characteristics) and operating parameters (e.g., laser 124 power, laser 124 movement, laser 124 trajectory, build plate 102 movement, a three-dimensional profile scan of the part, hatch-to-contour angle, scan length, position on build plate 102, scan angle with respect to cross flow, proximity to other parts, part orientation, path plan, etc.) specific for the build of the part stored in non-transitory memory that defines a method that the processor utilizes as the processor controls the performance of the additive manufacturing process. The processor can be a central processing unit (CPU), a controller, one or more microprocessors, a core processor, an array of processors, a control circuit, or other type of hardware processor device.

The AMA 110 can have a laser 124 as the energy source. The laser 124 can be used to impart a laser beam 126 on the layer 122 to generate a laser interaction zone 128. The laser interaction zone 128 can be the portion of the layer 122 where the plasma is being formed. The laser interaction zone 128 can include a melt pool 114 and a plume 116. The melt pool 114 can be a liquid formation of the build material 120. The plume 116 can be a plasma and/or vapor formation of the build material 120 and may include components of the surrounding atmosphere. The plume 116 can be formed adjacent the melt pool 114. For example, the melt pool 114 can be a liquid build material 120 region at or near the surface 112 of the build material 120 where the laser beam 126 makes contact with the build material 120. The plume 116 can be an elongated mobile column of plasma or vapor of build material 120 extending upward from the melt pool 114.

An embodiment of the AMA 110 can include a monitoring unit 130. The monitoring unit 130 can include processors, sensors, and other circuitry configured to record data and analyze data related to the operational parameters of the AMA 110. The operational parameters can include laser 124 triggering (e.g., the laser 124 turning on and off), laser 124 power, laser 124 position, laser 124 movement, build plate 102 movement, build layer 122 number, feed rate of the build material 120, as well as the other operating parameters disclosed herein. The monitoring unit 130 can be configured to provide high-speed (e.g., 100 kHz), real-time measurements to generate the operational parameter data.

An embodiment of the system 100 can include a sensor system 106 (which can include any one or combination of the optical sensor 106a, acoustic sensor 106b, and multi-spectral sensor 106c). In some embodiments, the a sensor system 106 can be configured to be communicatively associated with the AMA 110 or be a part of the AMA 110. This can include being communicatively associated with the monitoring unit 130. Some embodiments can include synchronizing the sensor system 106 with the monitoring unit 130. This can facilitate configuring the sensor system 106 to operate at a rate set by the monitoring unit 130 (e.g., 100 kHz).

The laser 124 can be configured so that the laser beam being emitted there-from is incident upon the surface of the building material layer 122 at an angle α. α can be defined as an angle of the laser beam relative to a geometric plane of the surface 112 of the building material layer 122. α can be within a range from 45 degrees to 135 degrees. For example, optical elements (e.g., lenses, prisms, mirrors, reflectors, refractors, collimators, beam splitters, etc.) and actuators (e.g., microelectromechanical system (MEMS), gimbal assemblies, etc.) of the laser 124 can be used to direct the laser beam 126 in a predetermined direction so that it is incident upon the building material layer 122 at a. Any of the actuators can be actuated to cause α to be constant or to vary. The multi-spectral sensor 106c that receives data in the form of electromagnetic emissions, can be configured to receive electromagnetic emission light from the surface 112 of the part at an angle β. β can be defined as an angle of the optical receiver's axis of the sensor 106c relative to the geometric plane that is the surface 112 of the building material layer 122. β can be within a range from 45 degrees to 135 degrees. Optical elements and actuators of the sensor 106c can be used to cause the sensor 106c to be positioned at β. Any of the actuators can be actuated to cause β to be constant or to vary.

α can be the same as or different from β. It is contemplated for β to be different from α so as to keep the sensor 106c out of the laser beam's optical path. For example, α can be 90 degrees and β can be 105 degrees. Keeping β different from α may be referred to herein as generating an off-axis sensor arrangement. Embodiments of the system 100 can be configured to set the sensor off-axis with respect to the laser 124 so as to allow the sensor 106c to collect data simultaneously as the laser 124 is used to build the part.

As noted herein, a build can involve formation of the part by melting or fusing build material 120 deposited in layers 122. While it is contemplated for each layer 122 to include the same build material 120, one layer 122 can be of a first type of build material 120 and another layer 122 can be a second type of build material 120.

It is contemplated for the sensors of the sensor system 106 to be able to scan for light from an entire surface of the build material 120 and/or sound from the entire volume of the build chamber 108. For example, the sensors of the sensor system 106 can be configured to collect and process electro-optical emissions from the entire surface of the build material 120 and/or sound from the entire volume of the build chamber 108. Thus, an embodiment of the system 100 can be configured to maintain a predetermined distance between the sensors of sensor system 106 and the surface of the build material 120 so as to allow for scanning the entire surface of the part and/or build chamber 108. For example, the surface of the build material 120 can be 275×275 $mm^2$. With this non-limiting example, the sensor(s) sensor system 106 can be positioned at a distance d=480 mm from the surface of the build material 120 as the sensor(s) of the sensor system 106 is/are at an angle β of 105 degrees. As noted herein, the build plate 102 can be moved downward after each layer 122 is deposited, which can allow for maintaining the d=480 mm distance. d being set to 480 mm is for the exemplary arrangement described above. It will be appreciated by one skilled in the art for d to be set at a distance that can allow the receivers of the sensor(s) of the sensor system 106 to capture all the electromagnetic emissions or sound data from the entire surface of the build material 120 and/or the entire volume of the build chamber 108.

As noted herein, embodiments of the sensor system 106 can be in communication with the monitoring unit 130. In some embodiments, the monitoring unit 130 can be used to monitor and control operating parameters of the AMA 110. Synchronizing the sensor system 106 with the monitoring unit 130 can facilitate generating a feedback loop. For example, real-time sensor data can be collected and analyzed to identify anomalies in the part as the part is being built. The information about anomalies can be processed by the monitoring unit 130 to make adjustments to the operating parameters and accommodate or correct for the anomalies. In some instances this can include aborting the build.

Embodiments of the system 100 also includes a CT scanner 132. The CT scanner 132 is a device that collects x-ray radiation measurements from multiple angles of a part. Digital geometry processing is used to generate a three-dimensional volume representation of the part. The CT scanner 132 is not part of the AMA 110, as it is contemplated for the CT scanner data to be used on a post-build part, while the other sensors (optical sensor 106a, an acoustic sensor 106b, a multi-spectral sensor 106c, and scan vector information 106d) are used to collect data on a new part being build in an in-situ manner. Thus, it is contemplated for the CT scanner 132 to be a stand-alone device for collecting CT images of a post-built part to be used solely to train the NN.

Figure 5:
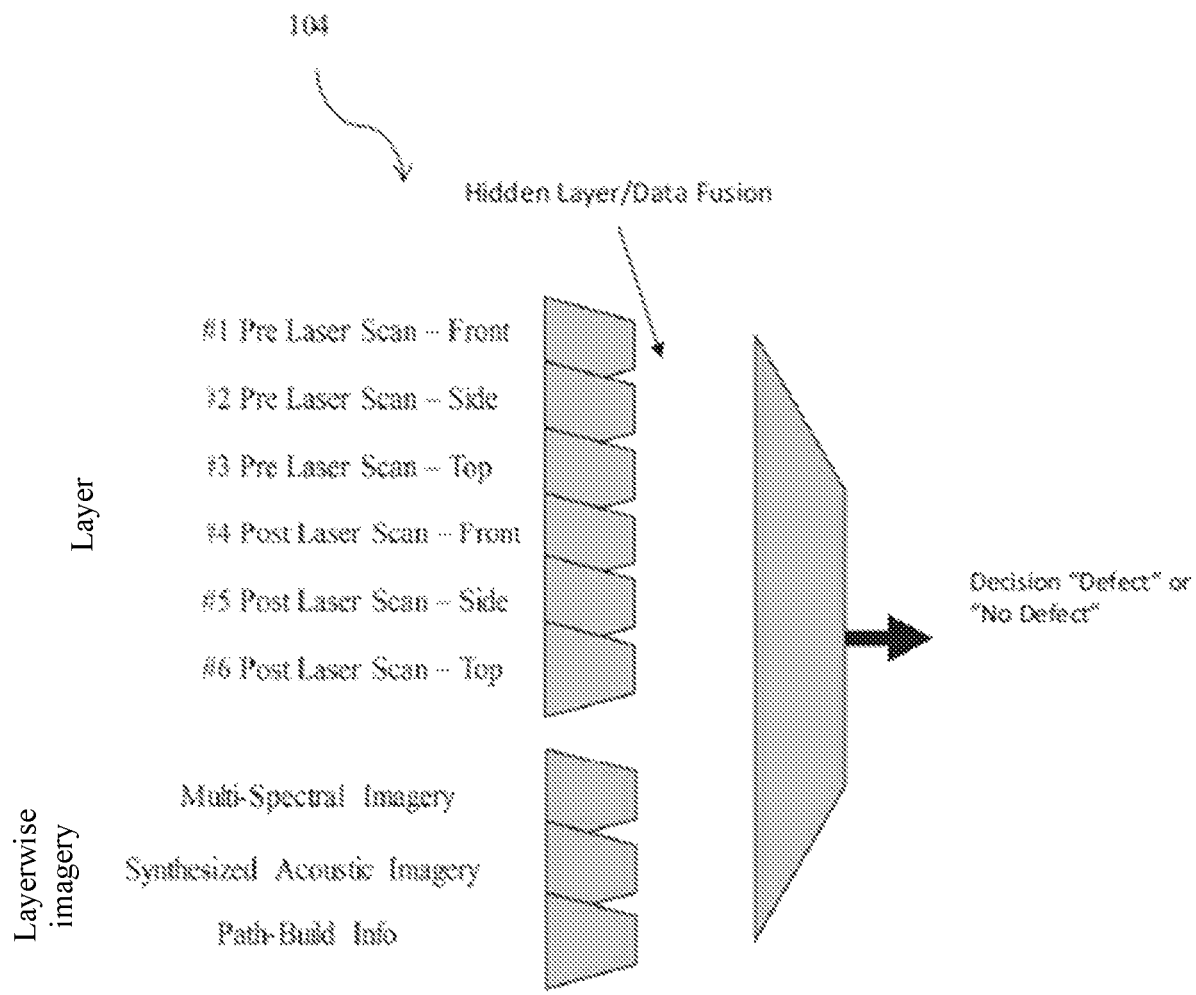
FIG. 5 shows an exemplary neural network flow diagram that may be used with the in-situ process monitoring system.

Embodiments of the system 100 also includes a computer device 134. The computer device 134 includes a processor (e.g., a central processing unit (CPU), a controller, one or more microprocessors, a core processor, an array of processors, a control circuit, or other type of hardware processor device) and a non-transitory memory configured to operate neural network (NN) 104 (see FIG. 5) and machine learning algorithms. The computer device 134 can be in communication with the any one or combination of the CT scanner 132, the AMA 110, the monitoring unit 130, and the sensor system 106. This can be via a hardwired or wireless communications interface. The computer device 134 can be used to predict where defects are occurring or will occur during the actual build of a part—i.e., the computer device 134 (using NN 104, machine learning, and the multi-modal sensor data) can perform in-situ process monitoring of the part as it is being built.

Figure 6:
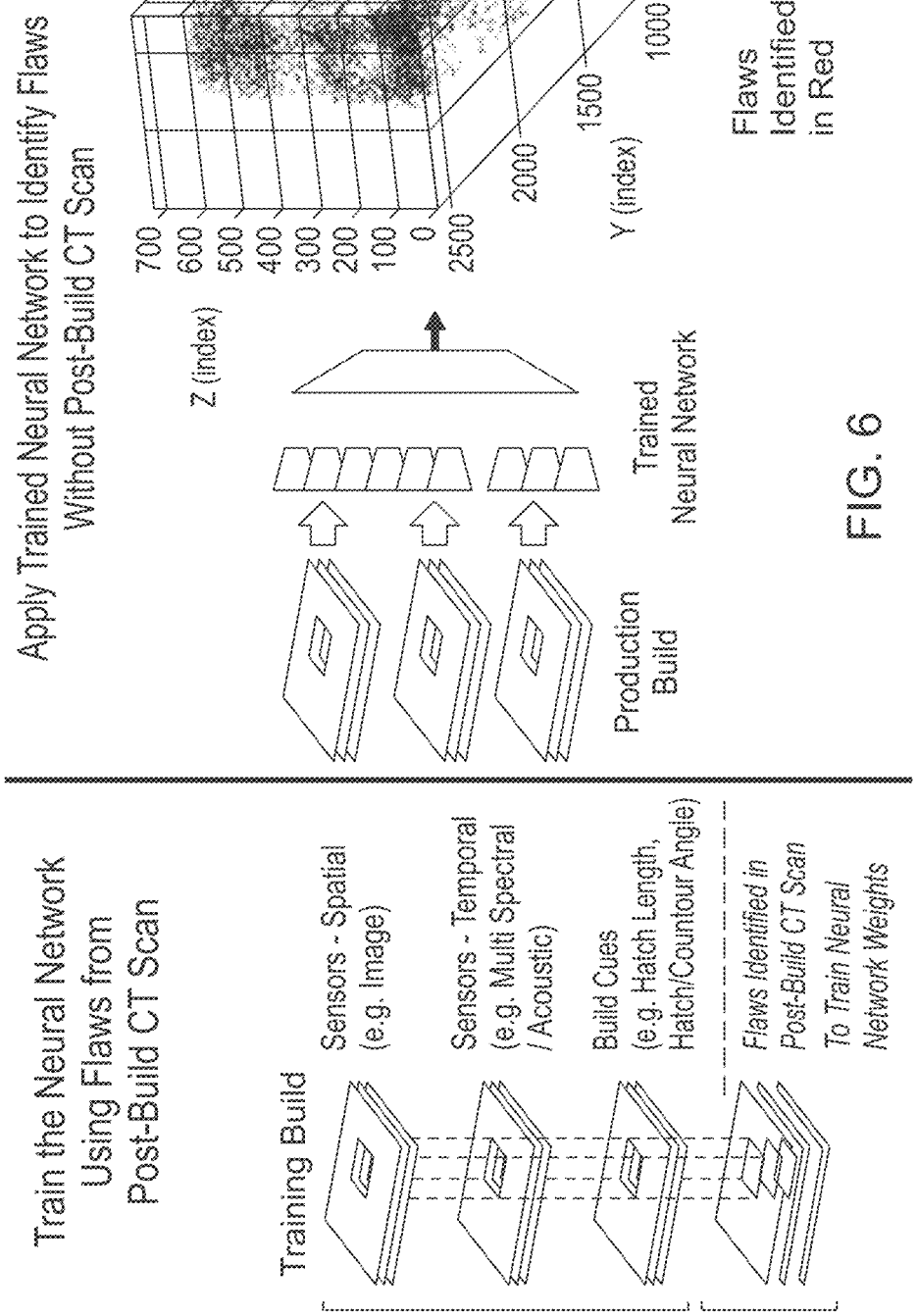
FIGS. 6-8 show exemplary process flow diagrams that may be used for the in-situ process monitoring system.
Figure 7:
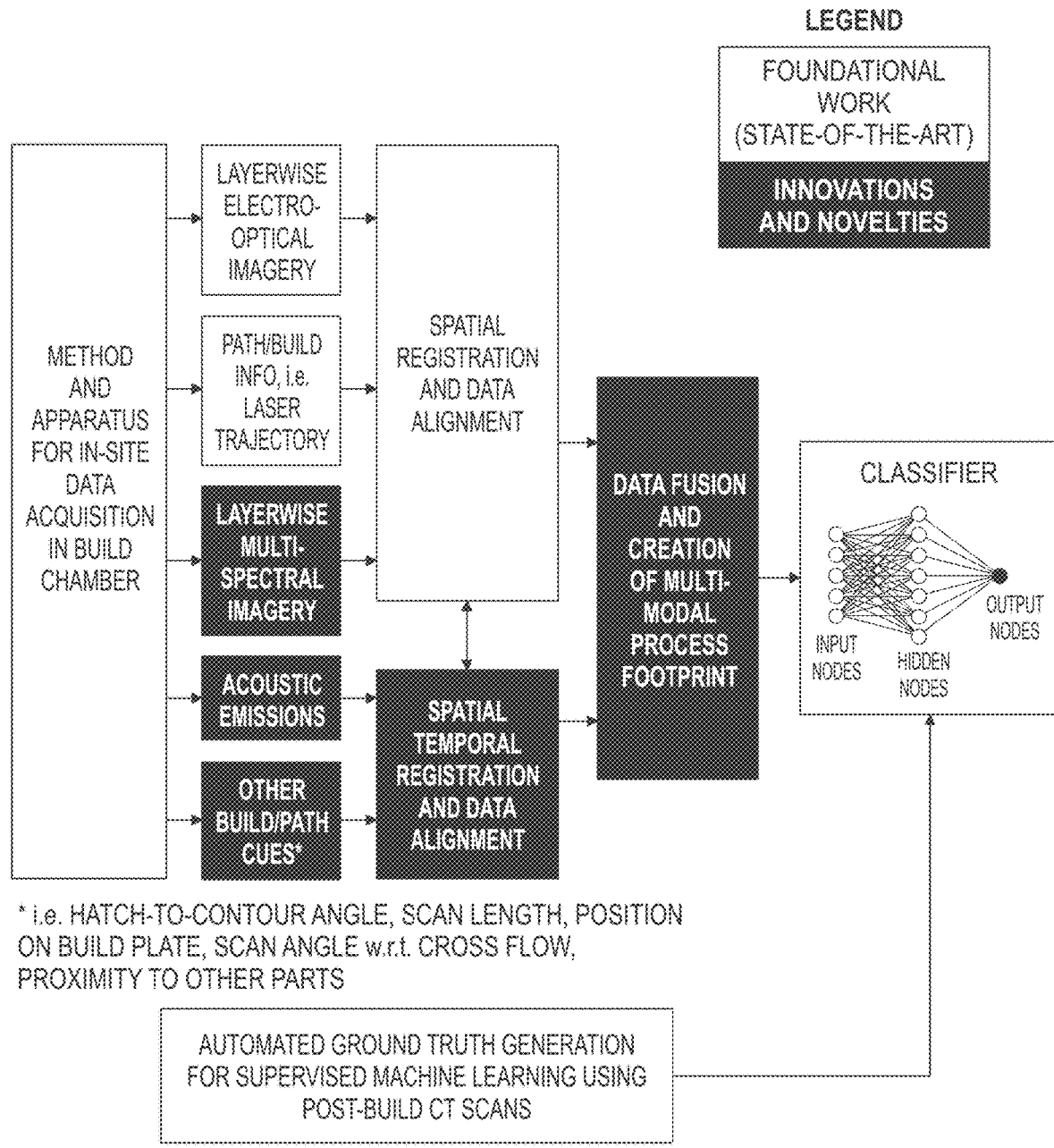
Figure 8:
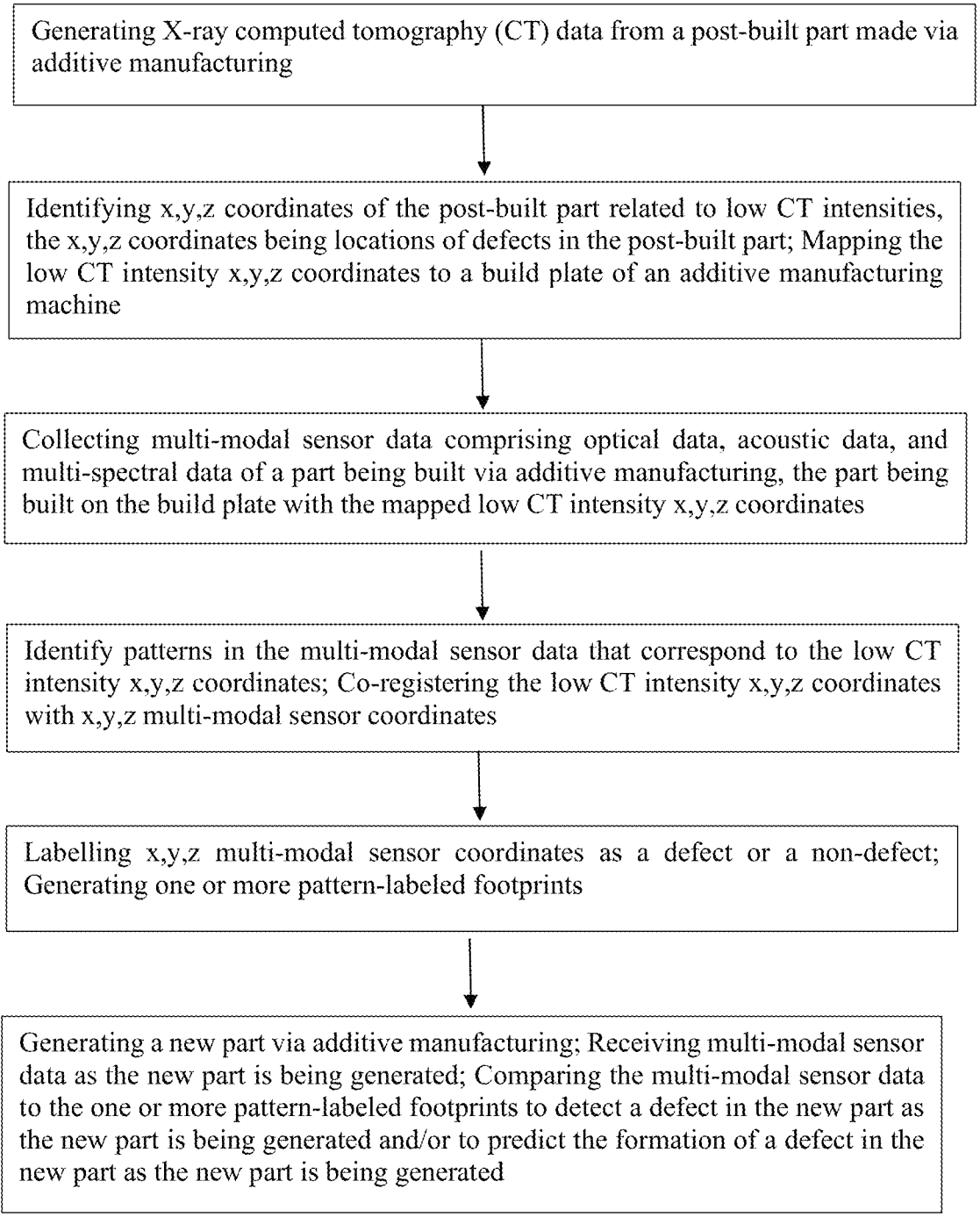

Referring to FIGS. 6-8, in an exemplary embodiment, the CT scanner 132 collects CT data from a post-built part. The CT data is in the form of CT images. CT data is collected from a plurality of post-built parts. For each post-built part, the computer device 134 analyzes the CT images to identify voxel areas in the CT image having either low or high CT intensities as compared to their local neighborhoods. This can be done using Gabor filtering techniques (e.g., using symmetric Gaussian kernels that inherently extract local minima and maxima in the CT intensity regardless of size and shape) at different scales, for example. Other filtering techniques can include Gaussian filtering. Low CT intensities are indicative of voids or defects, for which the X-ray return intensity is reduced. A significantly higher CT return intensity, although very rare, may indicate a super-density (perhaps as the result of powder contamination). Defect morphology, i.e. the size, shape and/or orientation, may be inferred by merging adjacent, anomalous CT voxels into defect clusters.

The computer device 134 causes the CT scanner 132 to generate a plurality of CT images for each post-built part. The low CT intensity voxels for each CT image is co-registered with an x,y,z coordinate of the post-built part, and thus each low CT intensity voxel for each CT image is co-registered with an x,y,z coordinate of the post-built part. The computer device 134 does this for a plurality of post-built parts to generate a library of CT data. In addition, the computer device 134 can also collect operational parameter data from the monitoring unit 130 of the AMA 110 for each post-built part. The computer device 134 can co-register the CT data and the operational parameter data to generate ground truth data. The library of ground truth data is sent to the memory (e.g., a database 136) of the computer device 134 for storage and later processing.

When building a new part in the AMA 110, the computer device 134 maps the x,y,z coordinates of the CT images to a reference frame of the AMA 110. The reference frame can be the build plate 102, for example. As the new part is being built, the computer device 134 causes the sensor system 106 to collect multi-modal sensor data. This can be achieved via the NN 104 (see FIGS. 5-6) operated by the computer device 134.

Sensor fusion techniques can be used to generate a footprint, the footprint being a fusion of sensor modal data. Spatial and temporal registration techniques can be used to align the multi-modal sensor data with the x,y,z coordinates of the reference frame so that each footprint can include multi-modal sensor data that is aligned with the x,y,z coordinates of the reference frame. For instance, synchronization between the multi-modal sensor data and the laser scanner can be used to pinpoint specific sensor events at precise locations of the build surface 112. The computer device 134 can superimpose the footprints on the reference frame (e.g., build plate 102).

Figure 13:
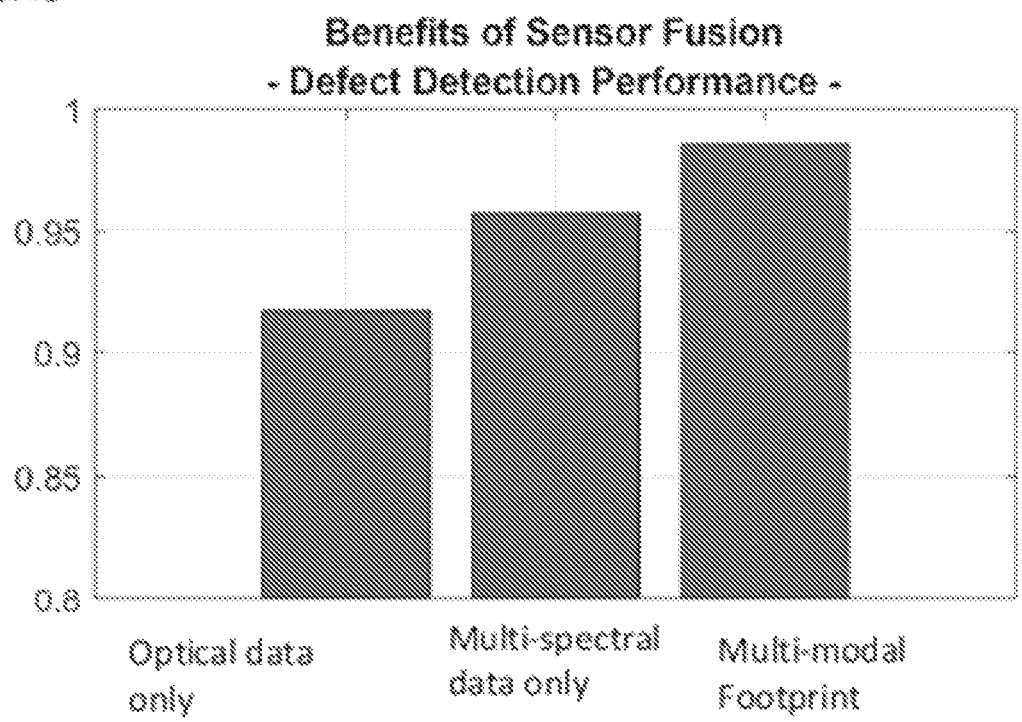
FIG. 13 shows experimentally validated performance increase when fusing multiple sensor modalities for defect classification, as compared to using single modalities.

Referring to FIG. 13, as compared to using single sensor modalities, sensor fusion may increase overall performance. Here, performance for binary classification, i.e. "defect' or "no defect" is measured by the area under the ROC curve.

As the build of the new part ensues, the computer device 134 uses machine learning to train the NN 104. The training involves identifying patterns in the footprint that correlate with patterns of the ground truth data. For instance, the computer device 134 can pull ground truth data from the database 136 and compare it to the multi-modal sensor data being collected as the new part is being built, and in particular compare the operating parameter data and/or CT data of the post-build parts corresponding to defects, non-defects, and pores to operating parameter data and/or multi-modal sensor data of the new part being built. The computer device 134 trains the NN 136 (via machine learning) to identify certain patterns in the operating parameter data and/or multi-modal sensor data of the new part being built as defects, non-defects, or pores.

For instance, operating parameter data of the new build is compared to operating parameter data of the ground truth data to identify similarities. A low CT intensity data reading at an x,y,z coordinate from that ground truth data (the data having similar operating parameter data as the operating parameter data of the new build) is used by the computer device 134 to record the multi-modal sensor data at the corresponding x,y,z coordinate point of the new build. The computer device 134, via the NN 104, identifies patterns in the multi-modal sensor data that are representative of the operating parameters at the x,y,z coordinate point. Because the x,y,z coordinate of the new build is correlated to an x,y,z coordinate of a low CT intensity reading in the ground truth data, the computer device 134 can associate the multi-modal sensor data pattern(s) with a defect. Similarly, multi-modal data patterns can be identified and associated with non-defects and pores. Thus, the computer device 134, via the NN 104 and machine learning, learns which patterns of operating data and/or multi-modal sensor data are indicators and/or predictors of defects, non-defects, or pores. The computer device 134 labels the identified patterns as a defect, a non-defect, or a pore. This can be done via a classifier engine 138 (classifier) within the program logic of the computer device 134. The computer device 134 then correlates the labeled patterns to the footprints. The pattern-labeled footprints are then stored in the database 138.

As the NN 104 is now trained, the system 100 is ready to be used in practice during an actual build of a part. As a part is being built, the computer device 134, using the NN 104 and the footprints, to determine where defects are being formed or to predict where/when defects will occur. For instance, before the build of a part commences, the computer device 134 retrieves at least one pattern-labeled footprint from the database 136 that corresponds to the current operating parameter data and current multi-modal sensor data. The pattern-labeled footprint is superimposed on the build plate 102 or other reference frame. As the build commences, the computer device 134 collects operating parameter data and current multi-modal sensor data. This can be achieved by the computer device 134 querying operating parameter data and multi-modal sensor data continuously, at a periodic rate, or at some other query schedule from the monitoring unit 130 and the sensor system 106. As the current operating parameter data and current multi-modal sensor data are received, the computer device 134 identifies patterns in the current operating data and/or current multi-modal sensor data that correspond to indicators and/or predictors of defects, non-defects, or pores. If the system 100 detects that a defect or pore has been formed, the build can then be aborted. For instance, the computer device 134 can transmit a signal that a defect has occurred to the AMA 110 (or any component thereof—e.g., the monitoring unit 130, the processor, etc.) to cause the AMA 110 to abort the build or display an alert to the user of the AMA 110 that the build should be aborted. In addition, or in the alternative, the system can record the x,y,z coordinate in its memory for that defect as a flag. Users of the system 100 can then review the flags at the end of the build to determine whether additional quality measurements should be made, whether the part is acceptable for its intended use, whether the part should be downgraded, whether the part should be discarded, etc. If the system 100 detects that a defect or pore is about to be formed, the computer device 134 can transmit a signal to the AMA 110 (or any component thereof—e.g., the monitoring unit 130, the processor, etc.) indicating the same. The user of the AMA 110 can make adjustments to the operating parameters to avoid the defect. In addition, or in the alternative, the computer device 134 can select a footprint that meets certain operating parameters corresponding to the quality specifications desired for the part and for which no defects (or a low probability of defects) will be formed, and transmit the operating parameters of that footprint to the AMA 110. The AMA 110 can then use the operating parameters of that footprint to update the additive manufacturing file for the part so that the AMA 110 operates in accordance therewith.

As the operating parameters change during the course of the build (e.g., as the additive manufacturing file causes them to change, as the additive manufacturing file is updated due to a predicted defect, as the build plate 102 moves to generate more layers, as the build material changes during the build, etc.) the computer device 134 retrieves another pattern-labeled footprint from the database that corresponds to the current operating parameter data and current multi-modal sensor data. The pattern-labeled footprint is superimposed on the build plate 102 or other reference frame, and the in-situ process monitoring described above continues. This process can continue until the end of the build or until some other predetermined time before the end of the build.

In addition to defect identification, the system 100 can be used for assessing material properties of the part based on the multi-modal sensor data. For instance, the multi-modal sensor data of the part can be used to predict or determine the material properties of the built part, as resulting material properties are influenced by the size, morphology, and frequency of defects. Material properties of a part are also linked to the underlying microstructure of the part, which in turn are affected by: (i) the thermal history (e.g., the melt pool 114 and plume 116 characteristics as well as initial substrate temperature); (ii) chemistry; and (iii) oxygen content during the build. Multi-modal sensor data, sensor fusion, and machine learning can be used to identify specific sensor footprints as proxies for certain mechanical properties of the part. For instance: relative thermal buildup can be estimated with build path info, and high/low heat can be been linked to keyhole porosity defects/lack-of-fusion defects, respectively; the angle of incidence of hatch path relative to contours influences the likelihood of flaws in this region; and the component geometry has significant influence on calculated path.

As noted above, the system 100 relies on spatial-temporal registration and data alignment of multi-modal sensor data with ground truth data, and in particular CT images. Synchronization between the multi-spectral sensor 106c signal and the laser scanner can be used to pinpoint specific spectral events at precise locations of the build surface, indicating areas on the build plate susceptible to defect formation. Synchronization between the laser scanner and multi-spectral sensor 106c results in a 3D point cloud of spectral intensities associated with emissions at those precise locations. Analytical strategies disclosed herein to identify correlations between spectral emissions and internal defects are employed once the spectral point cloud is registered to CT images.

Referring to FIG. 9, acoustic alignment can be achieved via cross-correlation between acoustic power and the change in laser 124 power. In addition to laser 124 power, the machine log also provides the x,y location of the laser 124 as a function of time. It is thus ideal as an anchor to align spatial and temporal data. The specific choice for the cross-correlation is driven by the belief that acoustic emissions are most noticeable whenever the laser 124 power changes from on to off or vice versa, i.e. when a significant pressure change occurs. So far, collected data confirms that assumption. More formally, assume that acoustic power is denoted by a(t), and laser 124 power is denoted by g(t). Then, shift the acoustic signal can be shifted in time by so that the cross correlation $(a(t)*|\dot{g}|(t))(\tau)$ is maximized. The cross correlation is defined as:

$$(a*|\dot{g}|)(\tau) = \int_{-\infty}^{+\infty} a(t+\tau)*|\dot{g}|(t)\,dt \qquad \text{Eq. (2)}$$

Figure 10:
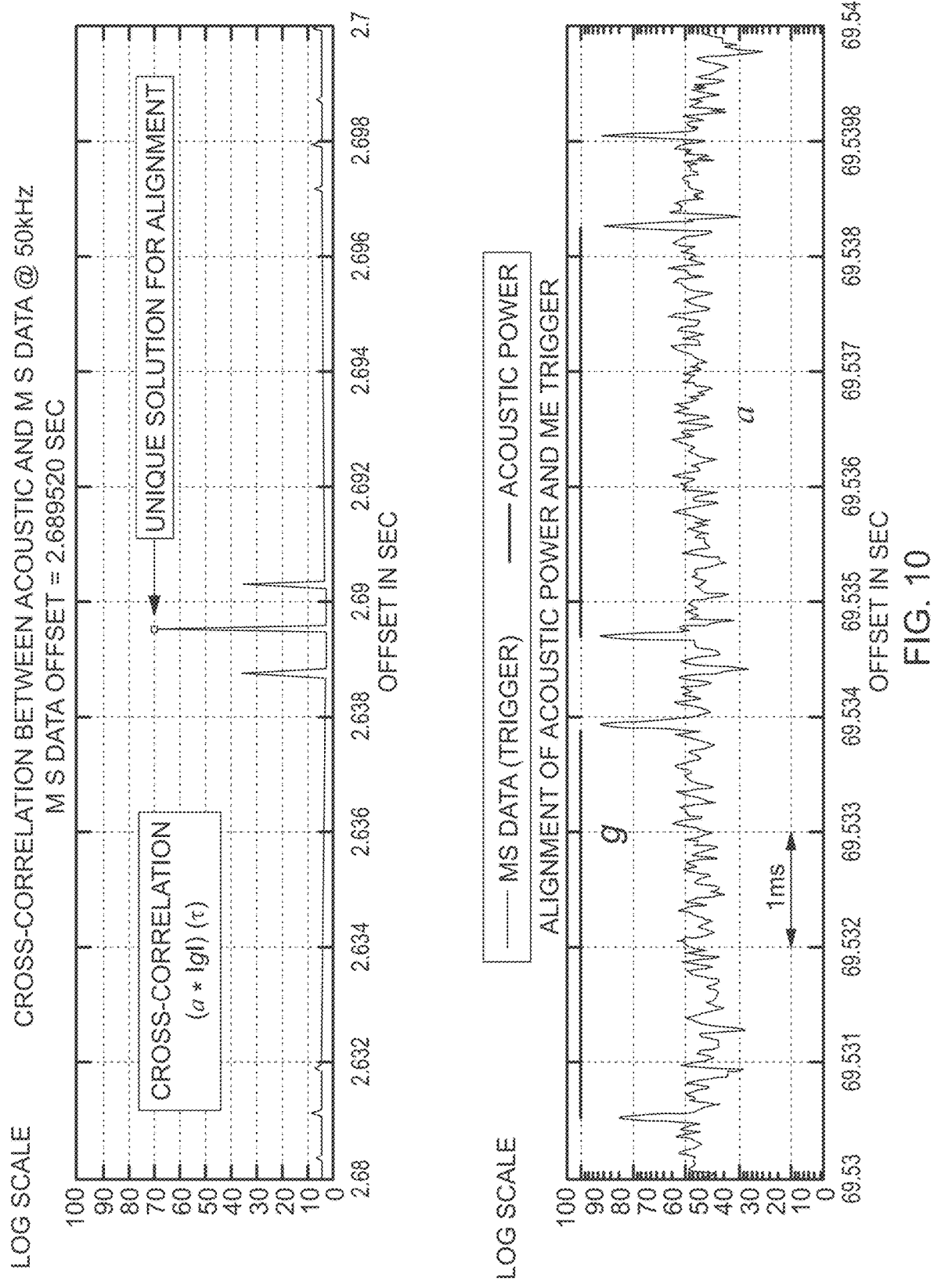
FIG. 10 shows cross-correlation coefficient as function of time shift τ, and zoomed-in time history of acoustic emissions and laser power when aligned for an exemplary sensor system.

FIG. 10 shows the cross-correlation coefficient (2) as function of τ in the top plot and the time histories of acoustic emissions and laser on/off power in the bottom plot. Clearly, there appears to be a unique solution for the best choice of the time shift parameter τ. Once aligned, it is apparent that peaks in the acoustic emissions align very well with on/off and off/on transition of the laser power.

Figure 11:
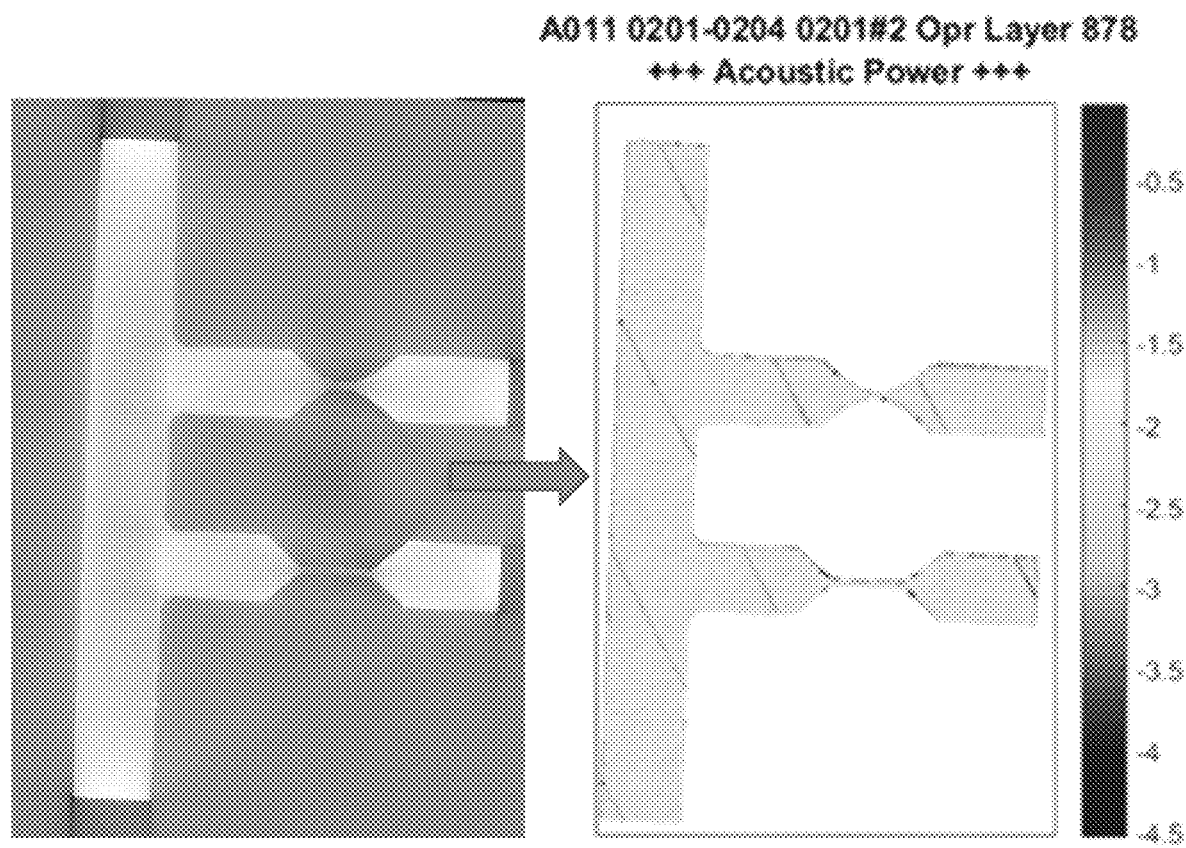
FIG. 11 shows a CT image (left) and synthetic acoustic image (right), where the synthetic acoustic image is created by aligning and mapping acoustic emissions into the spatial x,y,z domain.
Figure 12:
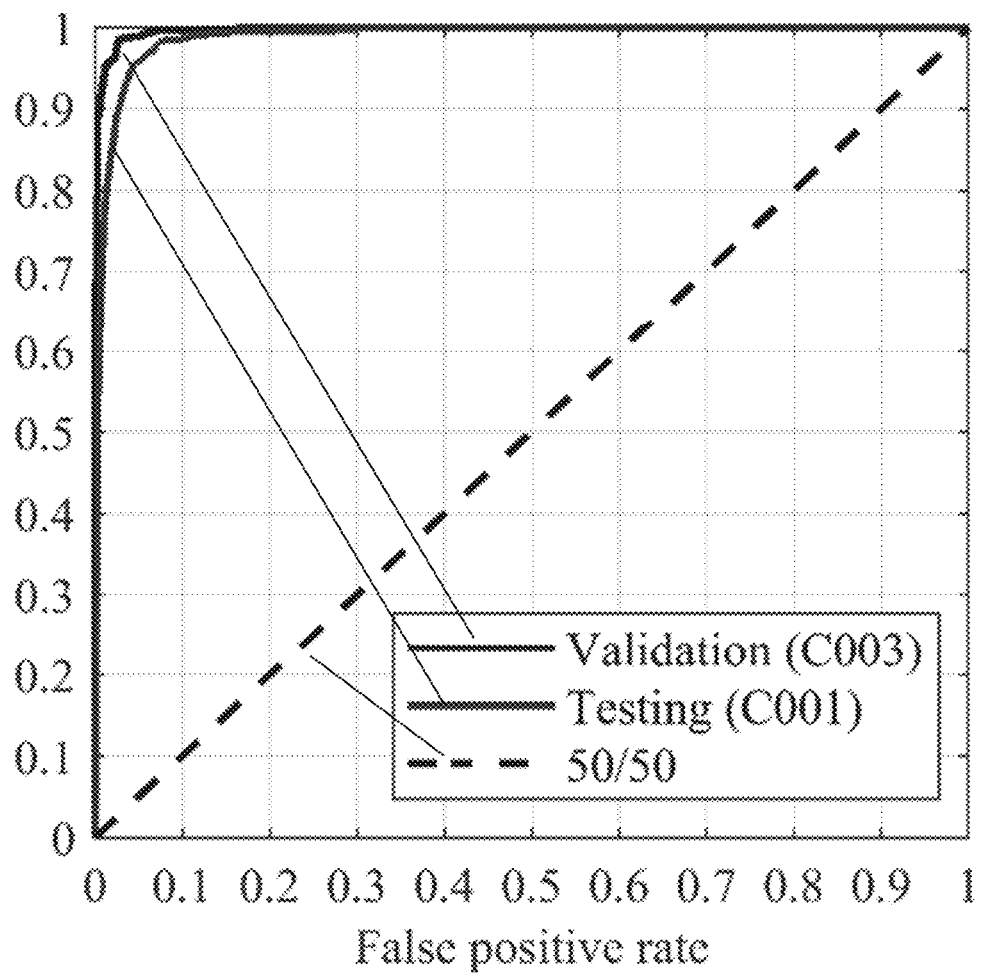
FIG. 12 shows experimentally validated performance metrics for defect classification using a receiver-operator curve. The NN shows excellent generalizability from validation data, captured from the same build the NN was trained on, toward test data, captured from a different build.

Once acoustic data is aligned to the laser 124 power and thus the machine log, it is possible to generate synthetic acoustic images that are of equal size and resolution as the layerwise images. In other words, acoustic emissions can be mapped from the time domain into the spatial domain of the build plate 102, thereby generating a rasterized image (see FIG. 11). This allows for streamlined ingestion into the data fusion block.

While embodiments of the system 100 are contemplated for performing in-situ processing of a part as it is being built, it is understood that some embodiments can also be used to guide post-build inspection techniques. For example, the system 100 can be used to identify anomalies within a region of interest. Knowing the region of interest, post-build inspection techniques (e.g., X-ray computer tomography (CT)) can be limited to the region of interest instead of analyzing the entire part.

It should be understood that modifications to the embodiments disclosed herein can be made to meet a particular set of design criteria. For instance, the number of or configuration of components or parameters may be used to meet a particular objective. In addition, any of the embodiments of the system 100 disclosed herein can be connected to other embodiments of the system 100 to generate a desired system configuration.

It will be apparent to those skilled in the art that numerous modifications and variations of the described examples and embodiments are possible in light of the above teachings of the disclosure. The disclosed examples and embodiments are presented for purposes of illustration only. Other alternative embodiments may include some or all of the features of the various embodiments disclosed herein. For instance, it is contemplated that a particular feature described, either individually or as part of an embodiment, can be combined with other individually described features, or parts of other embodiments. The elements and acts of the various embodiments described herein can therefore be combined to provide further embodiments.

Therefore, it is the intent to cover all such modifications and alternative embodiments as may come within the true scope of this invention, which is to be given the full breadth thereof. Additionally, the disclosure of a range of values is a disclosure of every numerical value within that range, including the end points. Thus, while certain exemplary embodiments of apparatuses and methods of making and using the same have been discussed and illustrated herein, it is to be distinctly understood that the invention is not limited thereto but may be otherwise variously embodied and practiced within the scope of the following claims.

It should also be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement. Thus, while certain exemplary embodiments of the system 100 have been shown and described above, it is to be distinctly understood that the invention is not limited thereto but may be otherwise variously embodied and practiced within the scope of the following claims.

What is claimed is:

1. A multi-modal sensor system for an additive manufacturing machine, comprising:
   a computer device;
   a sensor system, comprising:
      an optical sensor configured to record optical imagery of each layer of a part being formed via additive manufacturing and generate optical data output;
      an acoustic sensor configured to record acoustic data of a build chamber within which the part is being formed and generate acoustic data output; and a multi-spectral sensor configured to record spectral data of each layer of the part and generate spectral data output;
wherein the sensor system generates a multi-modal sensor output that is a compilation of the optical data output, the acoustic data output, and the spectral data output; and
wherein the computer device receives the multi-modal sensor output and generates a multi-modal footprint that is superimposed on a build plate of an additive manufacturing machine.

2. The system of claim 1, wherein the multi-modal sensor output includes scan vector data.

3. An in-situ additive manufacturing process monitoring system, comprising:
an additive manufacturing machine configured to generate a part on a build plate within a build chamber via additive manufacturing;
an X-ray computed tomography (CT) scanner configured to produce CT data from a post-built part made via additive manufacturing;
a multi-modal sensor system, comprising:
an optical sensor configured to record optical imagery of each layer of a part being formed via additive manufacturing and generate optical data output;
an acoustic sensor configured to record acoustic data of the build chamber within which the part is being formed and generate acoustic data output; and
a multi-spectral sensor configured to record spectral data of each layer of the part and generate spectral data output;
wherein the sensor system generates a multi-modal sensor output that is a compilation of the optical data output, the acoustic data output, and the spectral data output; and
a computer device configured to receive the CT data of the post-built part and the multi-modal sensor data of the part being formed, wherein the computer device is configured to:
identify x,y,z coordinates of the post-built part related to low CT intensities, the x,y,z coordinates being locations of defects in the post-built part;
map the low CT intensity x,y,z coordinates to the build plate of the additive manufacturing machine before and during the part is being formed;
identify patterns in the multi-modal sensor output data that correspond to the low CT intensity x,y,z coordinates;
co-register the low CT intensity x,y,z coordinates with x,y,z multi-modal sensor coordinates;
label x,y,z multi-modal sensor coordinates as a defect or a non-defect; and
generate one or more pattern-labeled footprints.

4. The system of claim 3, wherein the multi-modal sensor output includes scan vector data.

5. The system of claim 3, wherein:
the computer device receives multi-modal sensor output data as the additive manufacturing machine is used to generate a new part;
the computer device compares the multi-modal sensor output data to the one or more pattern-labeled footprints to detect a defect in the new part as the new part is being formed and/or to predict the formation of a defect in the new part as the new part is being formed.

6. The system of claim 3, wherein:
the computer device is configured to utilize Gabor filtering techniques and/or Gaussian filtering techniques to identify x,y,z coordinates of the post-built part related to low CT intensities.

7. The system if claim 3, wherein:
the computer device is configured to utilize sensor fusion to generate the multi-modal sensor data output.

8. The system of claim 3, wherein:
the computer device is configured to utilize a neural network and machine learning to identify patterns in the multi-modal sensor output data that correspond to the low CT intensity x,y,z coordinates.

9. The system of claim 3, wherein:
the CT scanner produces CT data from a plurality of post-built parts made via additive manufacturing;
the computer device receives the CT data from the plurality of post-built parts to generate a library of CT data and stores the library of CT data in a database; and
a computer device receives the CT data of the post-built part when the part is being formed by accessing the library of CT data in the database.

10. A method of in-situ process monitoring for an additive manufacturing process, the method comprising:
generating X-ray computed tomography (CT) data from a post-built part made via additive manufacturing;
identifying x,y,z coordinates of the post-built part related to low CT intensities, the x,y,z coordinates being locations of defects in the post-built part;
mapping the low CT intensity x,y,z coordinates to a build plate of an additive manufacturing machine;
collecting multi-modal sensor data comprising optical data, acoustic data, and multi-spectral data of a part being built via additive manufacturing, the part being built on the build plate with the mapped low CT intensity x,y,z coordinates;
identifying patterns in the multi-modal sensor data that correspond to the low CT intensity x,y,z coordinates;
co-registering the low CT intensity x,y,z coordinates with x,y,z multi-modal sensor coordinates;
labelling x,y,z multi-modal sensor coordinates as a defect or a non-defect; and
generating one or more pattern-labeled footprints.

11. The method of claim 10, wherein the multi-modal sensor data includes scan vector data.

12. The method of claim 10, further comprising:
generating a new part via additive manufacturing;
receiving multi-modal sensor data as the new part is being generated; and
comparing the multi-modal sensor data to the one or more pattern-labeled footprints to detect a defect in the new part as the new part is being generated and/or to predict the formation of a defect in the new part as the new part is being generated.

13. The method of claim 10, further comprising:
identifying x,y,z coordinates of the post-built part related to low CT intensities via Gabor and/or Gaussian filtering techniques.

14. The method of claim 10, further comprising:
generating the multi-modal sensor data via sensor fusion.

15. The method of claim 10, further comprising:
identifying patterns in the multi-modal sensor data that correspond to the low CT intensity x,y,z coordinates via a neural network and machine learning.

16. The method of claim 10, further comprising:
generating CT data from a plurality of post-built parts made via additive manufacturing.

17. The method of claim 15, further comprising:
receiving the CT data from the plurality of post-built parts to generate a library of CT data.

18. The method of claim 16, further comprising:
accessing the library of CT data to receive the CT data of the post-built part.

19. The method of claim 11, further comprising:
aborting the build of the new part when the defect is detected and/or predicted.

20. The method of claim 11, further comprising:
adjusting operating parameters of the additive manufacturing process used to build the new part when the defect is detected and/or predicted.

21. The method of claim 19, further comprising:
using operating parameters associated with the one or more pattern-labeled footprints to adjust the operating parameters.

22. The method of claim 10, further comprising:
generating a new part via additive manufacturing;
receiving multi-modal sensor data as the new part is being generated; and
comparing the multi-modal sensor data to the one or more pattern-labeled footprints to determine and/or predict material properties of the new part as the new part is being generated.

23. The method of claim 10, further comprising:
generating a new part via additive manufacturing;
receiving multi-modal sensor data as the new part is being generated; and
comparing the multi-modal sensor data to the one or more pattern-labeled footprints to identify x,y,z coordinates in the new part that correspond to detects in the new part; and
using the identification of the x,y,z coordinates to guide post-build inspection.

* * * * *